(12) United States Patent
Hosamani et al.

(10) Patent No.: US 10,291,478 B1
(45) Date of Patent: May 14, 2019

(54) GRAPH-BASED NETWORK TOPOLOGY VALIDATION

(71) Applicant: Juniper Networks, Inc., Sunnyvale, CA (US)

(72) Inventors: Vijaya Kumar Hosamani, Bangalore (IN); Swathi Nagaraj, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 30 days.

(21) Appl. No.: 15/640,627

(22) Filed: Jul. 3, 2017

(51) Int. Cl.
*H04L 12/66* (2006.01)
*H04L 12/24* (2006.01)

(52) U.S. Cl.
CPC .......... *H04L 41/12* (2013.01); *H04L 41/0873* (2013.01)

(58) Field of Classification Search
CPC ........................... H04L 41/12; H04L 41/0873
See application file for complete search history.

(56) References Cited

U.S. PATENT DOCUMENTS

| | | | |
|---|---|---|---|
| 5,821,937 A | 10/1998 | Tonelli et al. | |
| 2003/0046390 A1 | 3/2003 | Ball et al. | |
| 2008/0116449 A1* | 5/2008 | Macready | B82Y 10/00 257/31 |
| 2008/0281947 A1* | 11/2008 | Kumar | H04L 41/0806 709/220 |
| 2009/0316602 A1 | 12/2009 | Nandy et al. | |
| 2015/0229549 A1* | 8/2015 | Ennis | H04L 41/5009 709/224 |
| 2015/0278396 A1* | 10/2015 | Vasilyeva | G06F 17/30958 707/769 |
| 2015/0365314 A1 | 12/2015 | Hiscock et al. | |
| 2018/0173760 A1* | 6/2018 | Viken Valvag | G06F 17/30463 |

OTHER PUBLICATIONS

Koutra et al., "Algorithms for Graph Similarity and Subgraph Matching," https://pdfs.semanticscholar.org/5055/1518a193ffe3f3155368b43ba27ebc9c194b.pdf, Dec. 4, 2011, 50 pages.
Melnik et al., "Similarity Flooding: A Versatile Graph Matching Algorithm and its Application to Schema Matching," http://ilpubs.stanford.edu:8090/730/1/2002-1.pdf, Feb. 26, 2002, 12 pages.

* cited by examiner

*Primary Examiner* — Abdelnabi O Musa
(74) *Attorney, Agent, or Firm* — Harrity & Harrity, LLP

(57) ABSTRACT

A device may include one more processors to receive designed network information corresponding to a designed network; generate a data graph corresponding to a topology of the designed network based on the designed network information; receive discovered network information corresponding to discovered network devices of a discovered network; generate a query graph corresponding to the discovered network based on the discovered network information; perform a validation analysis of a topology of the discovered network relative to the topology of the designed network based on the data graph and the query graph; and/or perform an action based on a result of the validation analysis.

20 Claims, 5 Drawing Sheets

GRAPH-BASED NETWORK TOPOLOGY VALIDATION

BACKGROUND

A topology of a network is an arrangement of various network devices that creates links and nodes of the network. A topology of a network may be designed by a network designer and set up or configured by a technician on an intended site. A branch network may be a portion of a network toward an edge of the network. Branches may be added to a network when the technician connects, configures, or activates new network devices (e.g., network devices of the branch) to the network.

SUMMARY

According to some implementations, a device may include one more processors to receive designed network information corresponding to a designed network; generate a data graph corresponding to a topology of the designed network based on the designed network information; receive discovered network information corresponding to discovered network devices of a discovered network; generate a query graph corresponding to the discovered network based on the discovered network information; perform a validation analysis of a topology of the discovered network relative to the topology of the designed network based on the data graph and the query graph; and/or perform an action based on a result of the validation analysis.

According to some implementations, a non-transitory computer-readable medium may store instructions, the instructions may include one or more instructions that, when executed by one or more processors, may cause the one or more processors to receive designed network information corresponding to a designed network; generate a data graph corresponding to a topology of the designed network based on the designed network information; receive discovered network information corresponding to discovered network devices of a discovered network; generate a query graph corresponding to the discovered network based on the discovered network information; map the discovered network devices to network devices of the designed network based on the data graph and the query graph; perform a validation analysis of a topology of the discovered network determined based on mapping the discovered network devices to the network devices of the designed network; and/or perform an action based on a result of the validation analysis.

According to some implementations, a method may include receiving, by a device, designed network information corresponding to a designed network; generating, by the device, a data graph corresponding to a topology of the designed network based on the designed network information; receiving, by the device, discovered network information corresponding to discovered network devices of a discovered network; generating, by the device, a query graph corresponding to the discovered network based on the discovered network information; performing, by the device, a validation analysis of a topology of the discovered network relative to the topology of the designed network using the data graph and the query graph; and/or providing, by the device, information associated with the validation analysis to permit an action to be performed.

DETAILED DESCRIPTION

Figure 1A:
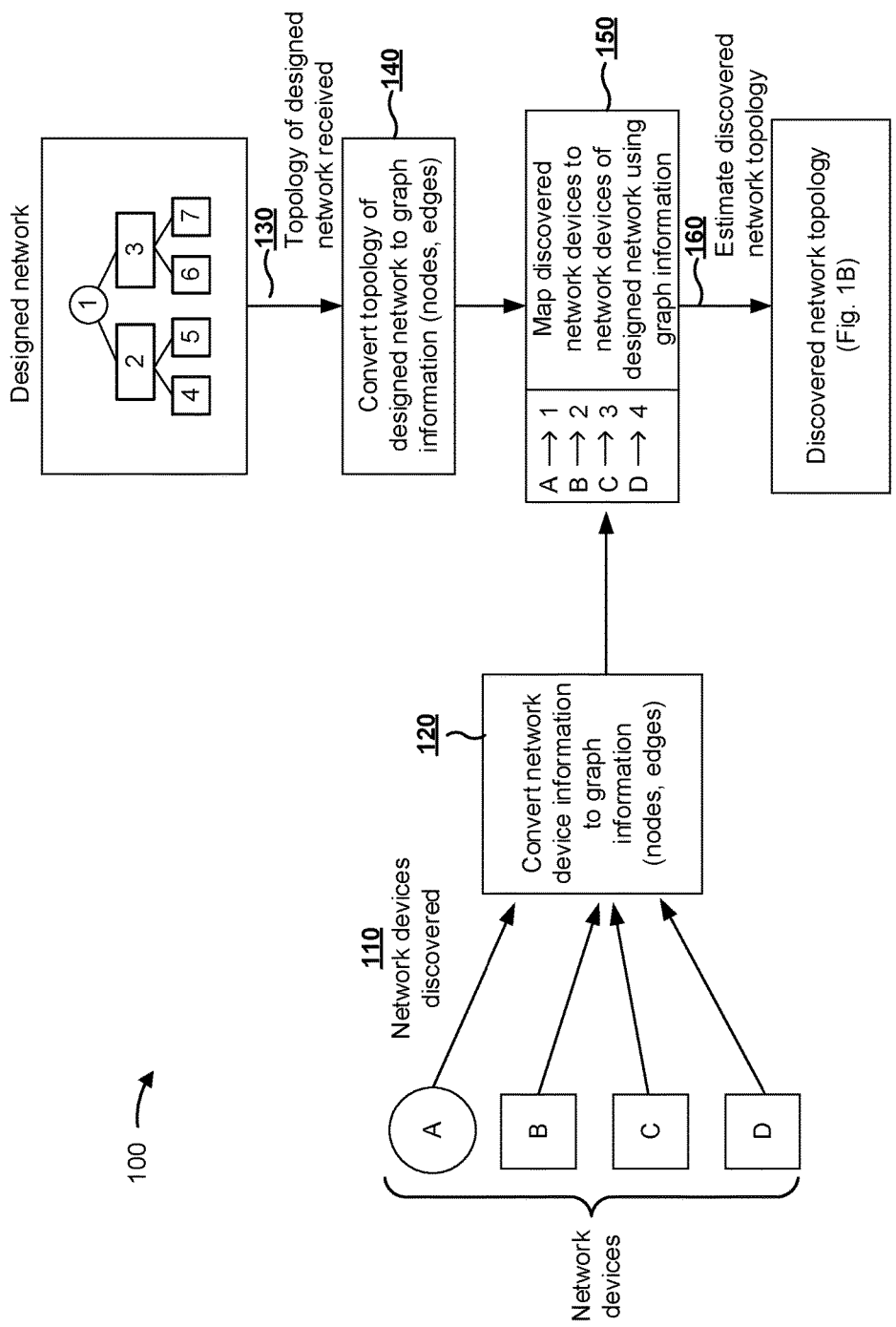
FIGS. 1A and 1B are diagrams of an overview of an example implementation described herein.

The following detailed description of example implementations refers to the accompanying drawings. The same reference numbers in different drawings may identify the same or similar elements.

Network management may include or involve validating networks prior to profiling network devices and deploying policies to the network devices. For example, when a branch (e.g., a network of one or more network devices) is added to a network, the branch may be validated to verify that the topology of the branch matches a particular design of the branch. In such an example, the branch network is to be validated before deployment of profiles or policies to the network devices. This validation process may be performed to confirm the network was successfully set up as designed without any mistakes (e.g., an incorrect port connection, connecting an incorrect model of a network device, connecting an incorrect network device, etc.). Furthermore, network devices of the newly added branch network may come online at various or unexpected times (e.g., based on how or when a technician establishes a connection between the network devices and a network management device). Therefore, in many instances, this validation process may involve several iterations of user interaction to verify the setup of the network devices (e.g., connections to other nodes, port connections, etc.) in the branch. As such, the greater the size of the branch (e.g., a branch may include thousands of network devices and tens or hundreds of thousands of ports), the greater the amount of user time, resources, and cost to validate the branch.

Some implementations, described herein, provide a network management device that may perform topology validation (e.g., of a branch of a network) using a graph generated from a network of discovered devices (referred to herein as a "discovered network") and a graph generated from a designed network. Using both graphs, in some implementations described herein, the network devices of the discovered network may be mapped to network devices of the designed network to automatically determine or estimate the configuration of the devices within the discovered network and, thus, the topology of the discovered network. Furthermore, some implementations, described herein, may automatically detect potential mistakes or conflicts (e.g., when a device of a discovered network may be perceived to be configured in multiple locations or various locations within the discovered network). Accordingly, some implementations, described herein, may enable automatic topology validation and/or identification of conflicts among devices of a discovered network to reduce an amount of user interaction to validate a discovered network. Furthermore, some implementations, described herein, may increase accuracy in validating the network (by eliminating human error and/or removing subjectivity in the validation process) and facilitate automatic profile and/or policy deployment to devices of the discovered network. Accordingly, network resources may be conserved by avoiding improper deployment of profiles and policies to the devices, causing failures, inoperability, and shutdowns within the network.

Figure 1B:
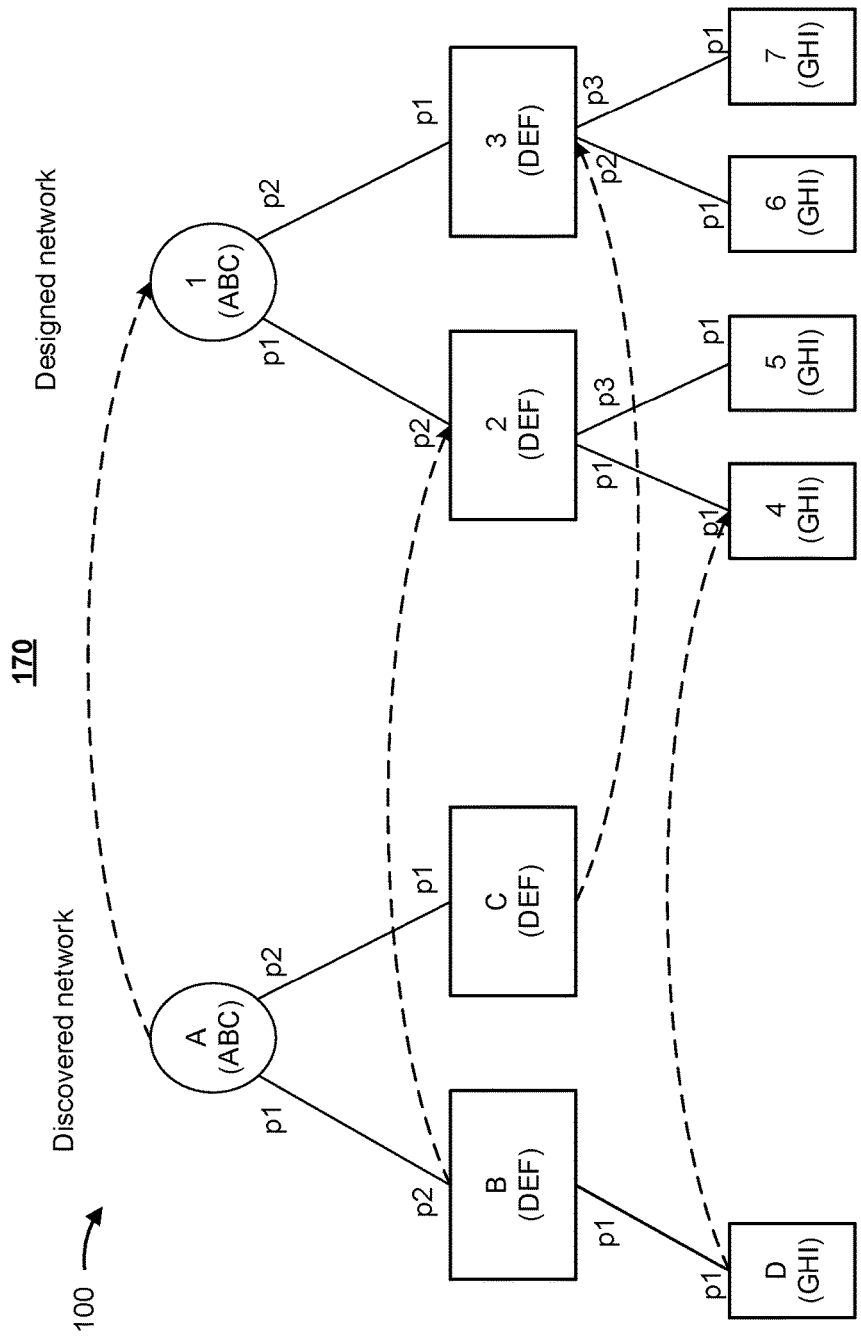

FIGS. 1A and 1B are diagrams of an overview of an example implementation 100 described herein. In the example implementation 100 of FIGS. 1A and 1B, several discovered network devices A-D are mapped to a designed network of network devices 1-7 to validate a network of the discovered network devices A-D.

In FIG. 1A, the network devices A-D of the example implementation 100 are discovered, as shown by reference number 110. For example, the network devices A-D may be discovered based on being activated, set up (perhaps by a network technician), connected to a network management device, connected to a network, powered on, or the like. The network devices A-D may be devices of a branch of a network that is to be configured similar to the designed network of network devices 1-7. Upon discovery of the network devices A-D, information may be received from the network devices A-D and converted to graph information, as shown by reference number 120. The received information may be in the form of data, a message, text, a file, an image, or the like. The graph information may include node information and edge information corresponding to the network devices A-D. For example, the network device A may be represented by node information, such as information about the network device A (e.g., information indicating a capability of the network device A, information indicating the ports of the network device A, information indicating a type of the network device A, etc.), information indicating neighbor network devices of the network device A (e.g., one or more network devices that appear to be connected to the network device A), or the like. Additionally, or alternatively, the network device A may be represented by edge information, such as port information of the network device A (e.g., model information of the network device A, information indicating which ports of the network device A are connected to which ports of neighbor network devices).

In the example implementation 100 of FIG. 1A, as shown by reference number 130, information representative of a topology of a network design (which may be referred to herein as the "designed network") is received. For example, the designed network may be provided from a network designer to indicate how the network devices A-D are to be configured in a branch network. The designed network may be received in the form of data, a message, text, a file, an image, or the like. Based on receiving the designed network, as shown by reference number 140, the designed network may be converted to graph information (e.g., with nodes and edges). The graph information may include node information and edge information corresponding to the network devices 1-7 identified in the designed network.

As shown by reference number 150 of FIG. 1A, the network devices A-D, of the discovered network, may be mapped to the network devices 1-7, of the designed network, using the graph information (as shown, (A→1, B→2, C→3, D→4). For example, a validation analysis may be performed to map the nodes and edges of the graph of the discovered network to the nodes and edges of the graph of the designed network. The validation analysis may involve, for example, determining a node similarity, a neighbor node similarity, a link similarity among pairs of devices (i.e., a device from the discovered network and a device from the designed network), or the like. In some implementations, a similarity calculation may be performed that applies weights to pairs of devices based on the determined similarity of the pairs. Based on the validation analysis and mapping of the nodes and edges of the discovered network and the nodes and edges of the designed network, a topology of the network devices of the discovered network can be estimated, as shown by reference number 160. In some implementations described herein, using the estimated topology from the validation analysis, actions may be performed (e.g., deploying profiles and policies to the network devices of the discovered network, presenting the estimated topology information to a user for review, presenting information of conflicts in the estimated topology to a user, etc.).

In some implementations, as shown by reference number 170 of FIG. 1B, a presentation of the mapping of the discovered network to the designed network is provided. For example, the presentation of the mapping of the discovered network to the designed network may be presented to a user via a user interface. As shown in FIG. 1B, an example presentation may show indicators, such as mapping arrows (illustrated as dashed lines), network device information (e.g., device type shown by shape, identifier information provided, etc.), model information (shown as ABC, DEF, GHI), port information of the communication links (shown as p1, p2, p3), a validation status of the mapped discovered network, or the like. Accordingly, a user may review the estimated topology to validate the topology of the discovered network and/or address any conflicts identified by the validation analysis. In some implementations, confidence scores or indicators may be presented to the user for the mapping. The example confidence scores may indicate a level of confidence that a particular network device of the discovered network is accurately mapped to a particular network device of the designed network.

Accordingly, the example implementation 100 of FIGS. 1A and 1B provides an estimated topology of the discovered network based on the designed network. Using the estimated topology, a validation status of the discovered network may be determined or provided. In some implementations, if the discovered network is validated based on the estimated topology of the discovered network, profiles and policies may be automatically deployed to the network devices of the discovered network. Accordingly, some implementations described herein may conserve network resources by eliminating human error in validating networks and, thus, preventing improper network profiles or improper network policies from being deployed to discovered network devices of a branch. Furthermore, providing automatic validation of a network to ensure accurate deployment of profiles and policies to the network devices may further provide seamless onboarding of branch networks without failures, inoperability, or shut downs.

In some implementations, a user may review the estimated topology to confirm the validated discovered network or address conflicts automatically determined from the estimated topology of the discovered network. Accordingly, the example implementation 100 may reduce user interaction to detect conflicts within a branch, eliminate subjectivity in detecting conflicts in a branch, and ultimately validate a branch of a network, thus conserving user time and resources to deploy profiles and policies to the network devices.

As indicated above, the example implementation 100 of FIGS. 1A and 1B is provided merely as an example. Other example implementations are possible and may differ from what was described with regard to FIGS. 1A and 1B.

Figure 2:
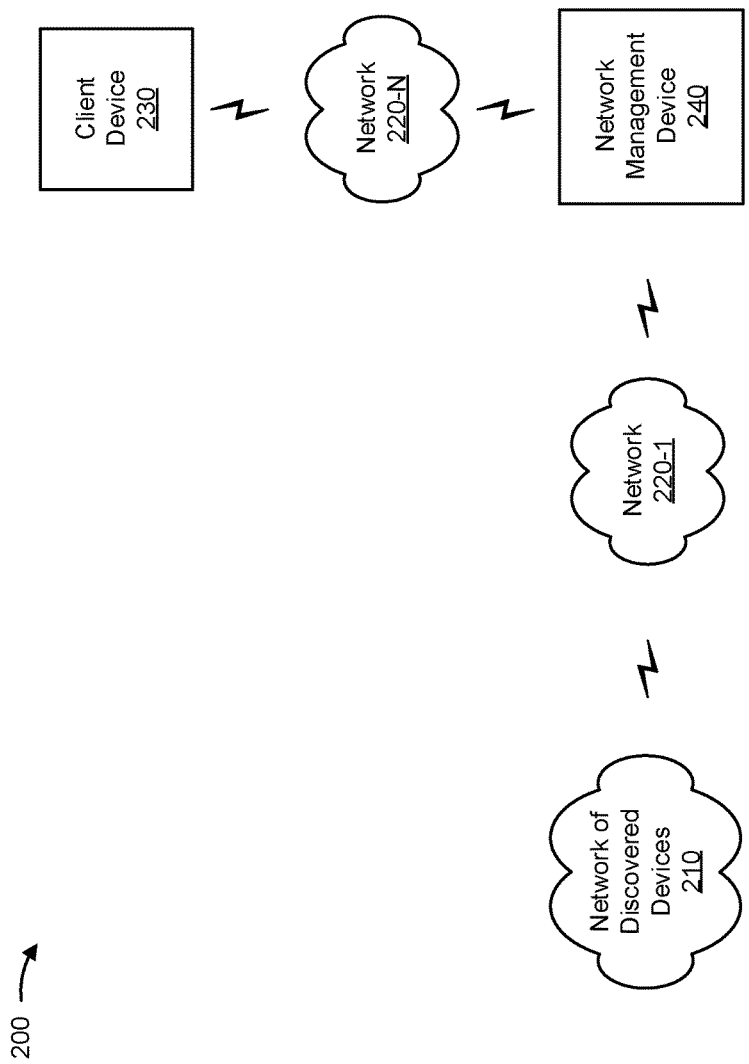
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, the environment 200 may include a network of discovered devices 210 (which may be referred to herein as the "discovered network 210"), one or more networks 220-1 through 220-N (N≥1) (hereinafter referred to collectively as "networks 220," and individually as "network 220"), a client device 230, and a network management device 240. Devices of the environment 200 may interconnect via wired connections, wireless connections, or a combination of wired and wireless connections.

The discovered network 210 includes one or more network devices that are to be configured into a network (e.g., a branch). For example, the network device(s) of the discovered network 210 may be activated and/or brought online to establish the discovered network. The discovered network 210 of FIG. 2 is communicatively coupled with the network management device 240 via the network 220.

The network device(s) of the discovered network may include one or more devices (e.g., one or more traffic transfer devices) capable of processing and/or transferring traffic between devices of the discovered network 210 and the network 220. For example, the network devices of the discovered network may include a firewall, a router, a gateway, a switch, a hub, a bridge, a reverse proxy, a server (e.g., a proxy server), a security device, an intrusion detection device, a load balancer, or a similar device.

The network 220 includes one or more wired and/or wireless networks. For example, the network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The client device 230 includes one or more devices capable of receiving, generating, storing, processing, and/or providing information associated with designing a network and/or a network topology. For example, the client device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations described herein, a network designer may use the client device 230 to provide a designed network topology (or information representing a designed network topology) to the network management device 240 via the network 220.

Network management device 240 includes one or more devices capable of managing or controlling a network and/or performing a validation analysis in accordance with some implementations herein. For example, the network management device 240 may include a server, a group of servers, a virtual machine or a group of virtual machines executing on one or more computer devices of a cloud computing environment, or the like. In some implementations, network management device 240 may be a physical device implemented within a housing, such as a chassis. In some implementations, network management device 240 may be a virtual device implemented by one or more computer devices of a cloud computing environment or data center.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
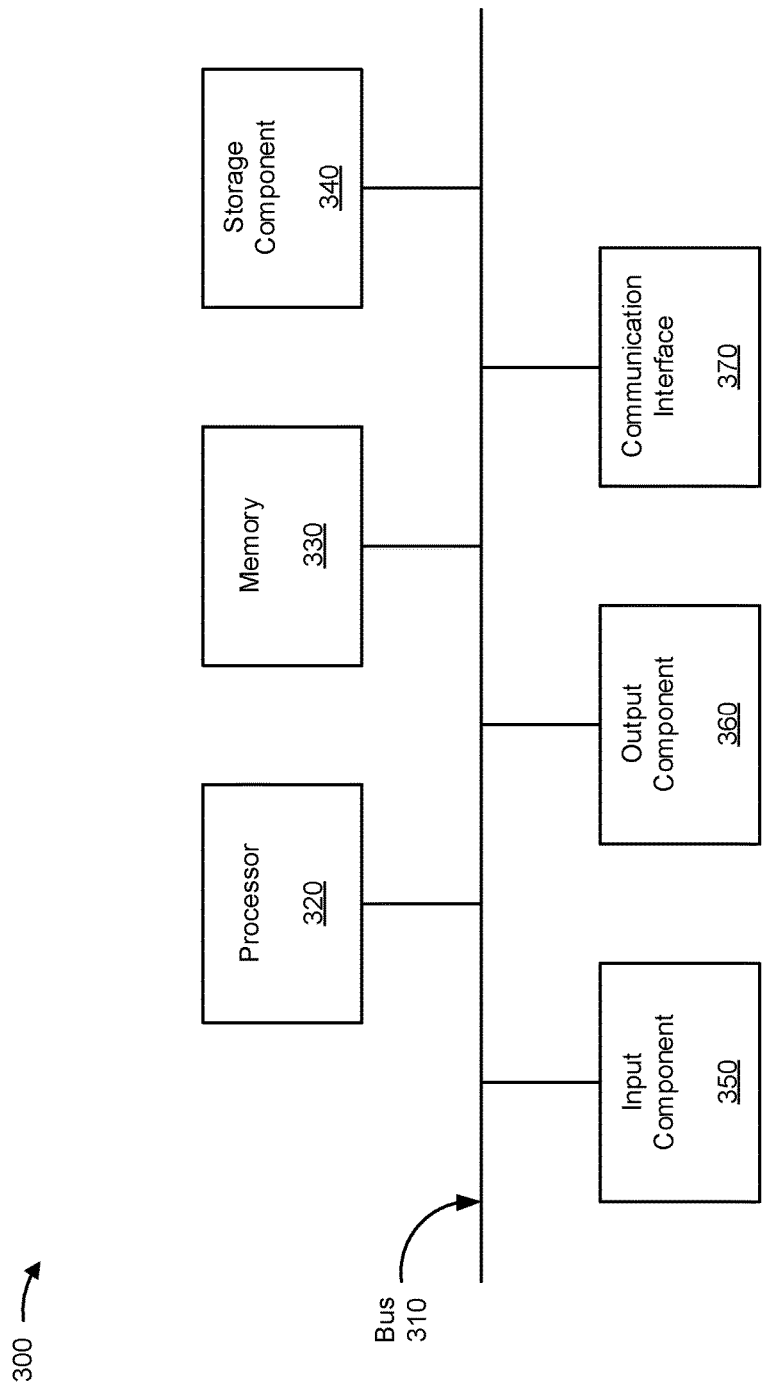
FIG. 3 is a diagram of example components of one or more devices of FIG. 2.

FIG. 3 is a diagram of example components of a device 300. Device 300 may correspond to network devices of the discovered network 210, the client device 230, and/or the network management device 240. In some implementations, the network devices of the discovered network 210, client device 230, and/or network management device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of the device 300 may perform one or more functions described as being performed by another set of components of device 300.

Figure 4:
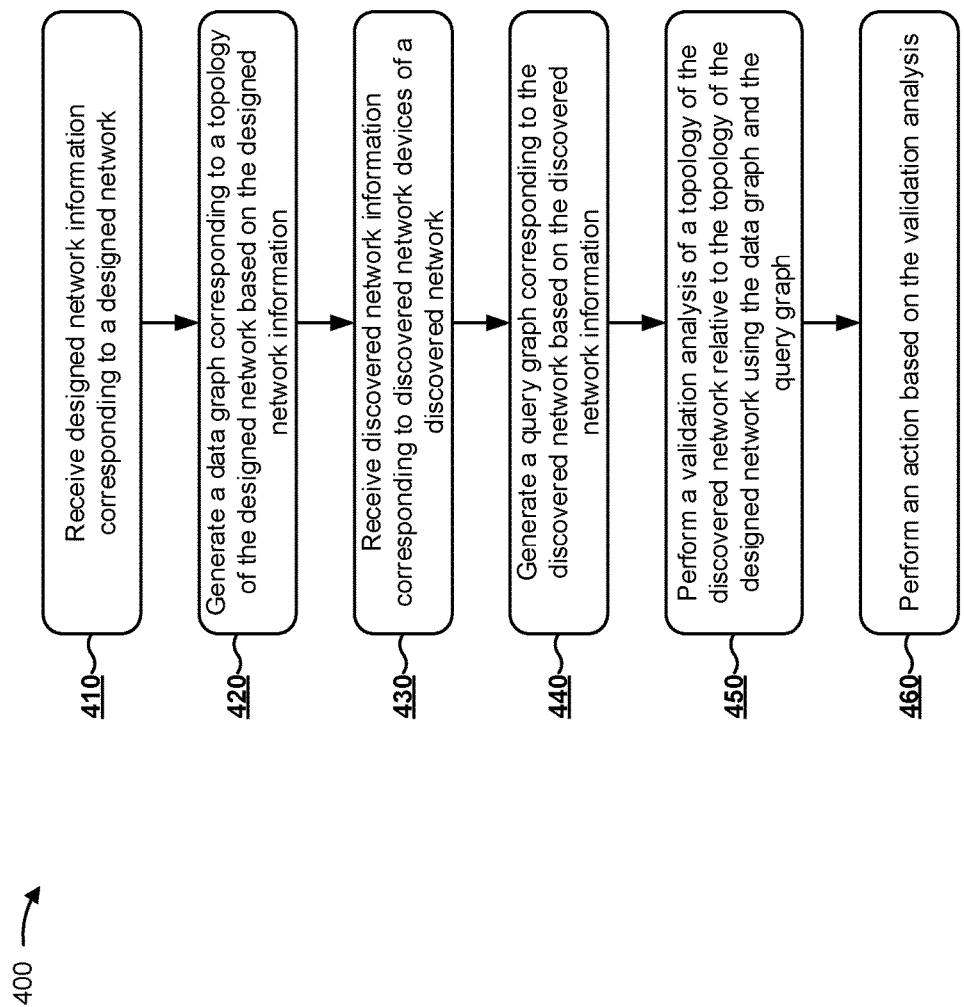
FIG. 4 is a flow chart of an example process for topology validation.

FIG. 4 is a flow chart of an example process 400 for topology validation. In some implementations, one or more process blocks of FIG. 4 may be performed by the network management device 240. In some implementations, one or more process blocks of FIG. 4 may be performed by another device or a group of devices separate from or including the network management device 240, such as the network devices of the discovered network 210 or the client device 230.

As shown in FIG. 4, process 400 may include receiving designed network information corresponding to a designed network (block 410). For example, the network management device 240 may receive the designed network information corresponding to the designed network. In some implementations, the network management device 240 may receive the designed network information periodically, according to a schedule, based on a user of the client device 230 inputting and/or sending the designed network information from the client device 230 to the network management device 240, or the like.

As used herein, a designed network is a network having a topology that is automatically designed or designed by a user, such as a network designer, a network administrator, or the like. The topology of the designed network may serve as a model for a discovered network. For example, a network technician configuring network devices of a discovered network may refer to the designed network to set up the discovered network. In some implementations, the network management device 240 may automatically configure or attempt to configure a logical topology of the discovered network 210 based on the topology of the designed network received from the client device 230.

In some implementations, the designed network information may include data, a file, text, a message, an image, or the like including or representative of the designed network. The content of the designed network information may include network device information and link information of the designed network. The network device information of the designed network may include a number of network devices in the designed network, types of network devices in the designed network, connections between the network devices in the designed network, capabilities of the network devices in the designed network, software information (e.g., version, last update, etc.) for the network devices in the designed network, location information (e.g., physical location information, such as geographical information, site information, or rack/chassis location information, or logical information, such as the location within the designed network relative to other network devices of the designed network), neighbor device information, and/or the like. The link information of the designed network may include model information of the network devices indicating capabilities of the network devices, port information indicating which ports of the network devices are connected to other network devices, port information indicating which ports of the network devices are connected to which ports of other network devices, link type information, protocol information indicating a communication protocol used over links, information indicating communication capabilities over the link (e.g., speed, bandwidth, frequency/channel information, etc.), or the like.

In this way, the network management device 240 may receive designed network information to permit the network management device 240 to generate a data graph corresponding to a topology of the designed network.

As further shown in FIG. 4, process 400 may include generating a data graph corresponding to a topology of the designed network based on the designed network information (block 420). For example, the network management device 240 may generate the data graph corresponding to the topology of the designed network based on the designed network information. In some implementations, the network management device 240 may generate the data graph based on receiving the designed network information.

As used herein, a data graph is a graph representing the designed network (e.g., a designed network for which designed network information is received from the client device 230). The data graph may include any data structure (e.g., a task graph, a table, an index, a linked list, an array, a matrix, a database, etc.). The data graph of the designed network may include nodes and edges corresponding to network devices and communication links of the designed network, respectively. Accordingly, the data graph includes node information and edge information (which may be collectively referred to herein as data graph information). The node information of the data graph corresponds to the network device information of the network devices of the designed network, and the edge information of the data graph corresponds to the link information of the designed network.

In some implementations, to generate the data graph, the network management device 240 may analyze the designed network information and convert the designed network information into graph information (node information and edge information). For example, the designed network information (e.g., a file, a message, an image, text) may be converted into graph information by converting information corresponding to the network devices of the designed network into node information and information corresponding to the communication links of the designed network into edge information. For example, referring to the designed network of FIGS. 1A and 1B, node information for network device 1 of the designed network may indicate that network device 1 is connected to network devices 2 and 3 and may indicate the types of the respective neighbor network devices, so node information for node 1 of the data graph may indicate node 2 and node 3 are connected to node 1 (e.g., node 1(type X): node 2(type Y), node 3 (type Y)). In such an example, the edge information for the data graph may indicate model information and port information of network device 1 (e.g., model: ABC, port 1→node 2, port 2→node 3).

In this way, the network management device 240 may generate a data graph corresponding to a topology of a designed network (which may be received from the client device 230) that may be used to perform a validation analysis of a discovered network 210.

As further shown in FIG. 4, process 400 may include receiving discovered network information corresponding to discovered devices of a discovered network (block 430). For example, the network management device 240 may receive discovered network information corresponding to the discovered devices of the discovered network 210. In some implementations, the network management device 240 may receive the discovered network information from the network devices of the discovered network 210 individually (e.g., as each network device is connected to the discovered network 210, powered on, activated, etc.), collectively (e.g., as a group, when authorized by a user (e.g., after a technician connects all or some of the network devices of the discovered network 210), from a device that receives some or all of the discovered network information from the network devices of the discovered network 210, or the like), periodically, according to a schedule, or the like.

As used herein, the discovered network 210 is a network of discovered devices. For example, the discovered devices may be network devices that are discovered by the network management device 240 as the discovered devices are activated or connected to a network managed by the network management device 240 (e.g., the network 220). It is possible that some of the network devices of the discovered network 210 may be incorrectly positioned and/or connected (e.g., due to an error by a technician setting up the discovered network 210). As such, because the network devices of the discovered network 210 may be incorrectly positioned and/or connected and/or activated or powered on at various times, a topology of the discovered network 210 may not be readily identified by the network management device 240. Accordingly, the network management device 240 may use the discovered network information received from the discovered network 210 to generate query graph information.

In some implementations, the discovered network information may include data, a file, text, a message, an image, or the like including or representative of the network devices of the discovered network 210. Similar to the designed network information, the content of the discovered network information may include network device information and link information from or corresponding to each of the discovered network devices of the discovered network 210. The network device information and link information for the discovered network 210 may be similar to the network device information and link information for the designed network. For example, the format or type of information included in the network device information and link information of the discovered network information may be the same as the format or type of network device information and link information of the designed network information. In some implementations, the network device information and link information for the discovered network 210 may include all of the network device information and link information for the designed network. In some implementations, the network device information and link information for the discovered network 210 may include a subset (less than all) of the network device information and link information for the designed network.

In this way, the network management device 240 may receive discovered network information to permit the network management device 240 to generate a query graph corresponding to discovered network devices of the discovered network 210 that may be analyzed in conjunction with the data graph corresponding to the designed network to perform a validation analysis.

As further shown in FIG. 4, process 400 may include generating a query graph corresponding to the discovered devices based on the discovered network information (block 440). For example, the network management device 240 may generate the query graph corresponding to the discovered network 210 based on the discovered network information. In some examples, the network management device 240 may generate the query graph based on receiving the discovered network information.

As used herein, a query graph is a graph representing the discovered network 210. The query graph may include any data structure (e.g., a task graph, a table, an index, a linked list, an array, a matrix, a database, etc.). The query graph of the discovered network may include nodes and edges corresponding to network devices and communication links of the discovered network 210, respectively. Accordingly, the query graph includes node information and edge information (which may be collectively referred to herein as query graph information). The node information of the query graph corresponds to the network device information of the network devices of the discovered network, and the edge information of the query graph corresponds to the link information of the discovered network.

In some implementations, to generate the query graph, the network management device 240 may analyze the discovered network information for the discovered network devices of the discovered network 210 and convert the discovered network information into graph information (node information and edge information). For example, the discovered network information for the discovered network devices may be converted into graph information by converting network device information of the discovered network devices into node information and converting link information for the communication links of the discovered network devices into edge information. Accordingly, the query graph may be formatted to be the same or similar to the data graph such that the query graph may include the same graph information or a subset of the graph information for the respective network devices and communication links of the discovered network as the data graph includes for the network devices and communication links of the designed network.

In this way, the network management device 240 may generate a query graph corresponding to the discovered network based on the discovered network information that may be used with the data graph to perform a validation analysis of the discovered network.

As further shown in FIG. 4, process 400 may include performing a validation analysis of a topology of the discovered network relative to the topology of the designed network based on the data graph and the query graph (block 450). For example, the network management device 240 may perform the validation analysis of the topology of the discovered network 210. In some implementations, the network management device 240 may use the data graph and the query graph to map the discovered network 210 to the designed network. In some implementations, the network management device 240 may validate the discovered network 210 based on the mapping of the discovered network 210 to the designed network.

In some implementations, the validation analysis may include comparing the data graph and the query graph to determine a similarity between nodes and edges of the data graph and nodes and edges of the query graph. For example, similarity calculations may be made between nodes and edges of the respective data graph and query graph indicating a similarity between network devices and communication links of the designed network and the discovered network 210. In some implementations, any suitable calculations, scoring, and/or weighting may be used or applied to estimate a similarity between nodes and edges of the query graph and the data graph. Furthermore, in some implementations, any node information and/or edge information corresponding to network devices and communication links of the discovered network 210 and the designed network may be used to map the discovered network devices of the discovered network 210 to network devices of the designed network.

The following describes an example validation analysis that may be performed to map the discovered network devices of the discovered network 210 to the network devices of the designed network. The example validation analysis includes iteratively comparing a node $q_i$ from the query graph to a node $d_i$ from the data graph to determine similarity of the node $q_i$ and the node $d_i$. The network management device 240 may determine similarity based on particular graph information of the data graph and the query graph for the nodes $q_i$ and $d_i$ satisfying a threshold similarity.

In some implementations, the validation analysis may include calculating a node similarity indicating a measure of similarity between a node of the query graph and a node of the data graph, calculating a neighbor node similarity indicating a measure of similarity between neighbors (i.e., neighbor nodes) of the node of the query graph and neighbors of the node of the data graph, and calculating a link similarity indicating a measure of similarity between the node of the query graph and the node of the data graph. A scoring and/or weighting system may be applied to determine the node similarity, the neighbor node similarity, and/or the link similarity. The validation analysis may involve combining scores calculated from the node similarity, the neighbor node similarity, and the link similarity in any suitable manner to determine a maximal similarity, which indicates a mapping of the query graph to the data graph. In some implementations, filtering may be performed following a particular process of the validation analysis or in between iterations of the validation analysis to reduce the amount of calculations performed in a subsequent step, thereby conserving computing resources.

Iterations of the example validation analysis described herein may be computed in any suitable order. In some implementations, the validation analysis may iteratively calculate the node similarity, the neighbor node similarity, and the link similarity for each pair of nodes. In some implementations, the validation analysis may iteratively calculate the node similarity for each pair of nodes, then calculate the neighbor node similarity for each pair of nodes, then calculate the link similarity for each pair of nodes. In some implementations, the node similarity, the neighbor node similarity, and the link similarity and/or iterations of the node similarity, neighbor node similarity, and link similarity may be calculated in any order or concurrently.

In some implementations, the network management device 240 (as part of the validation analysis) calculates a node similarity between a node of the query graph and a node of the data graph. The node similarity represents a measure of similarity between a node $q_i$ of the query graph and a node $d_i$ of the data graph. An example of the node similarity score may range from 0 to 1, where 0 indicates that the nodes $q_i$ and $d_i$ are determined to be dissimilar and 1 indicates that the nodes $q_i$ and $d_i$ are determined to be similar. A node similarity (NS) for nodes $q_i$ and $d_i$ may be calculated as follows:

$$NS = \frac{\text{\# of similar neighbors between } q_i \text{ and } d_i}{\text{\# of neighbors of } q_i} \quad (1)$$

where a neighbor is similar if the neighbors of nodes $q_i$ and $d_i$ are a same or similar type of device (e.g., a gateway, a server, a security device, a router, a switch, a hub, a bridge, a reverse proxy, an intrusion detection device, a load balancer, etc.).

In some implementations, the network management device 240 may generate or utilize a similarity matrix to calculate, manage, and/or maintain similarity scores between the nodes of the query graph and the nodes of the data graph. For example, a similarity matrix including calculated node similarities for the discovered network devices A-D (shown as qA through qD) and the designed network devices 1-7 (shown as d1 through d7) of FIGS. 1A and 1B may be constructed and populated as shown in Table 1.

TABLE 1

|    | d1 | d2 | d3  | d4  | d5  | d6  | d7  |
|----|----|----|-----|-----|-----|-----|-----|
| qA | 1  | 0  | 0   | 0.5 | 0.5 | 0.5 | 0.5 |
| qB | 0  | 1  | 0.5 | 0   | 0   | 0   | 0   |
| qC | 0  | 1  | 1   | 0   | 0   | 0   | 0   |
| qD | 1  | 0  | 0   | 1   | 1   | 1   | 1   |

As shown in this example, the node similarity for qA and d1 as calculated from Equation 1 is 1, the node similarity for qA and d2 is 0, the node similarity for qA and d3 is 0, and so on.

In some implementations, the network management device 240 (as part of the validation analysis) calculates a neighbor node similarity between neighbors of a node of the query graph $q_i$ and neighbors of a node of data graph $d_i$. To calculate the neighbor node (neighbor NS) similarity for nodes $q_i$ and $d_i$, the node similarity (NS) may be calculated for the neighbors of nodes $q_i$ and $d_i$ using equation 1. An example of the neighbor node similarity score may range from 0 to 1, where 0 indicates that the neighbors of node $q_i$ are not similar to the neighbors of node $d_i$ and 1 indicates that the neighbors of node $q_i$ are similar to the neighbors of node $d_i$. Referring to the above example, the neighbors of qA (qB and qC) are compared with the neighbors of d1 (d2 and d3), respectively. From the example implementation 100 of FIG. 1B, the neighbors of qB and qC are similar to the neighbors of d2 and d3, providing a neighbor node similarity score of 1 for qA and d1. In some implementations of the validation analysis, a value of the neighbor node similarity may be added to a value of the node similarity. Accordingly, in such an implementation, a score of 2 for qA and d1 may be found when calculating both node similarity (NS=1) and neighbor node similarity (neighbor NS=1).

In some implementations, the network management device 240 may update the similarity matrix to reflect both node similarity and neighbor node similarity calculations. Additionally, or alternatively, the network management device 240 may filter out particular node pairs ($q_i$, $d_j$) for neighbor node similarity calculations. For example, neighbor node similarity may be calculated for only node pairs ($q_i$, $d_j$) that satisfy a threshold node similarity. Such filtering may reduce the number of calculations needed to determine a mapping of the discovered network 210 to the designed network, thus conserving computation time and computing resources.

In some implementations, the network management device 240 (as part of the validation analysis) calculates a link similarity between edges of the query graph and edges of the data graph. A link similarity represents a measure of similarity between links of a node $q_i$ of the query graph and links of a node $d_j$ of the data graph. An example of the link similarity score may range from 0 to 1, where 0 indicates that links of the nodes $q_i$ and $d_j$ are determined to be dissimilar and 1 indicates that the links of the nodes $q_i$ and $d_j$ are determined to be similar. For $eq_i$ and $ed_i$ being edges of nodes $q_i$ and $d_j$, link similarity (LS) for nodes $q_i$ and $d_j$ may be calculated as follows:

$$LS = \frac{\text{\# of similar edge details between } eq_i \text{ and } ed_i}{\text{\# of possible edge detail matches between } eq_i \text{ and } ed_i} \quad (2)$$

where an edge detail can be any edge information of the edges $eq_i$ and $ed_i$ and the edge details are similar if the edge information from the query graph and the data graph satisfy a threshold similarity. In some implementations, the number of possible edge detail matches is limited to the available edge information for both the query graph and the data graph. For example, a possible match may occur only when the same type of edge information is available for both the query graph and the data graph. Accordingly, if additional edge information is available for one data graph but not for another, that additional edge information made not be considered as a possible edge detail match in Equation 2.

In some implementations, edge details may include model information of the nodes $q_i$, $q_j$ of the edges $eq_i$ and model information of the nodes $d_i$, $d_j$ of the edges $ed_i$ (e.g., a model identifier, such as a name or number of the model) and/or port information of the edges $eq_i$ and $ed_i$ (e.g., source port information and/or destination port information). Accordingly, in such an example, for each edge pair ($eq_i$, $ed_i$) the number of possible edge details would be four: model information of the first node of the edge, model information of the second node of the edge, port information of the first node of the edge, and port information of the second node of the edge.

As a more specific example, the example implementation 100 of FIG. 1B provides model information (shown as ABC, DEF, GHI of the network devices in the topology) and port information (p1, p2, p3, etc.) for the discovered network and the designed network. As shown in FIG. 1B, network device A communicates with network device B through port p1 of network device A and port p2 of network device B. Furthermore, in FIG. 1B, network device 1 communicates with network device 2 through port p1 of network device 1 and port p2 of network device 2. Accordingly, referring to the similarity calculation for the example node pair qA, d1, the edge details of the edge $eq_{AB}$ of qA includes model information of network device A (ABC), model information of network device B (DEF), port information of network device A (p1), port information of network device B (p2) and the details of $ed_{12}$ include model information of network device 1 (ABC), model information of network device 2 (DEF), port information of network device 1 (p1), and port information of network device 2 (p2). As shown, the link similarity calculation from Equation 1 would be 1 as all four edge details for edges $eq_{AB}$ and $eq_{12}$ match and all four edge details for $eq_{AC}$ and $eq_{13}$ also match. Accordingly, in such an example, a score of 3 for qA and d1 may be found when calculating node similarity (NS=1), neighbor node similarity (neighbor NS=1), and link similarity (LS=1).

Using the node similarity, the neighbor node similarity, and the link similarity, the network management device 240 may estimate the similarity between each combination of network devices of the discovered network 210 and the designed network. Based on the estimated similarity, the network management device 240 may determine a mapping of the network devices of the discovered network 210 to the network devices of the designed network to validate the discovered network 210.

In some implementations, the network management device 240 may estimate a mapping of the discovered network devices of the discovered network 210 to the network devices of the designed network by determining a maximal similarity among node pairs ($q_i$, $d_j$). For example, the network management device 240 may identify the node pairs ($q_i$, $d_j$) having the highest scores after calculating the node similarity, the neighbor node similarity, and the link similarity for all calculated combinations of $q_i$ and $d_j$ (which may be all combinations of $q_i$ and $d_j$ if no filtering is performed or some of the possible combinations if filtering is used). In some instances, a maximal similarity may involve summing the possible calculated combinations to find the highest maximal similarity score for a mapping. In some instances, a maximal similarity may involve a weighted summing of the possible calculated combinations to find the highest maximal similarity score for a mapping. For example, it may be desirable to apply a larger weight to a particular similarity measure, of the node similarity, the neighbor node similarity, and the link similarity, so that the particular similarity measure provides a larger influence to the maximal similarity calculation. The network management device 240 may calculate the maximal similarity to map the discovered devices of the discovered network 210 to the network devices of the designed network.

Referring to the example from FIGS. 1A and 1B, the node pairs ($q_i$, $d_j$) that may provide the maximal similarity are (qA, d1), (qB, d2), (qC, d3), and (qD, d4), all of which have a score of 3, for a total maximal similarity score of 12. Accordingly, the network management device 240 may calculate a maximal similarity calculation to estimate a mapping of the discovered network 210 based on the designed network. In some implementations, the network management device 240 may then validate the discovered network 210 based on the estimated mapping.

In some implementations, the network management device 240 may detect conflicts in the discovered network 210. For example, the network management device 240 may calculate similarity scores for node pairs ($q_i$, $d_j$) that are the same or within a threshold margin of error, indicating that a network device of the discovered network 210 may map to a number of different network devices of the designed network. Accordingly, in some implementations, rather than mapping the network device of the discovered network 210 that has a conflict, the network management device 240 may indicate the conflicts to a user and not map the network device of the discovered network 210 to a network device of the designed network without feedback from a user. In some implementations, the network management device 240 may address conflicts by requesting additional network device information from the discovered network 210 and/or waiting for additional network device information to arrive from the discovered network 210 (e.g., by waiting for other network devices to be discovered) so that the network management device 240 may resolve the conflicts automatically (i.e., without user input).

In some implementations, the network management device 240 may adhere to constraints of a designed network when performing a validation analysis. For example, the network management device 240 may indicate a particular mapping of the discovered network 210 and/or a validation status of the discovered network 210 based on constraints of the designed network. In some implementations, the network management device 240 may not validate a discovered network or may indicate that a discovered network cannot be validated until the discovered network matches the designed network exactly (e.g., the same number of network devices are correctly connected to the correct devices on the correct ports as designed). In some implementations, the network management device 240 may validate a discovered network or indicate that a discovered network 210 is valid if a percentage of the network devices that are correctly connected satisfy a threshold, if a percentage of communication links of the discovered network 210 that are correctly established in the discovered network 210 satisfy a threshold, if a percentage of designated components that are correctly configured in the discovered network 210 satisfy a threshold, if a percentage of designated communication links of the discovered network 210 that are correctly established satisfy a threshold, if at least a particular set of network devices that are correctly configured in the discovered network 210 satisfy a threshold, or the like.

In this way, the network management device 240 may perform a validation analysis of a topology of the discovered network 210 to enable the network management device 240 to perform an action based on the validation analysis.

As further shown in FIG. 4, process 400 may include performing an action based on the validation analysis (block 460). For example, the network management device 240 may perform the action based on the validation analysis. The network management device 240 may perform actions based on whether the validation analysis indicates that the discovered network 210 is validated.

In some implementations, the network management device 240 may automatically deploy profiles and policies to the network devices of the discovered network 210. In some implementations, the network management device 240 may automatically deploy the profiles and policies if the validation analysis indicates there are no conflicts in the discovered network 210. In some implementations, the network management device 240 may automatically deploy the profiles and policies if the validation analysis indicates the number conflicts in the discovered network 210 is less than a threshold.

In some implementations, the network management device 240 may calculate confidence scores indicating a level of confidence that a particular network device of the discovered network 210 maps to a network device of the designed network. The network management device 240 may use the confidence scores to determine whether to automatically deploy the profiles and policies. For example, the network management device 240 may automatically deploy the profiles and policies when all of the confidence scores satisfy a threshold, when at least a particular quantity or percentage of the confidence scores satisfy a threshold, when a combination of the confidence scores satisfies a threshold, or the like.

Accordingly, in such implementations, the automatic deployment of the profiles and policies may reduce or eliminate user interaction, improve accuracy of the deployment of the profiles and policies relative to a user manually deploying the profiles and policies, require less time to deploy the profiles and policies relative to a user manually deploying the profiles and policies, and/or conserve resources of a device used to deploy the profiles and policies and/or the network devices receiving the profiles and policies relative to a user manually deploying the profiles and policies.

In some implementations, the network management device 240 may present results of the validation analysis and/or an estimated topology of the discovered network 210 via a user interface. Accordingly, a user may readily determine if the discovered network 210 is valid, address any conflicts detected by the validation analysis, and/or review the topology of the discovered network 210. In some implementations, as described above, the network management device 240 may calculate confidence scores indicating a level of confidence that a particular network device of the discovered network 210 maps to a network device of the designed network. The confidence scores may be used to determine whether a conflict exists and/or whether to request user input to resolve a potential conflict. Using confidence scores in this manner may conserve computing resources relative to declaring any non-exact match as a conflict.

In some implementations, the network management device 240 may schedule a technician to visit the discovered network 210. For example, the network management device 240 may automatically populate a calendar of the technician with instructions regarding actions to be taken relative to the discovered network 210 (e.g., analyze configuration of network device A, check link connecting network devices A and B, missing link connecting port 1 of network device C to port 4 of network device D, or the like). Additionally, or alternatively, the network management device 240 may provide, to the technician, step-by-step instructions on how to resolve conflicts identified in the discovered network 210 (e.g., check the link connecting port 2 of network device A to port 1 of network device B—this link should be connected to port 3 of network device A, not port 2, or the like). Additionally, or alternatively, the network management device 240 may provide, to the technician, instructions for locating network devices that have potential conflicts (e.g., locate network device A at 123 Main Street, Sunnyvale, room XYZ, on rack 123, shelf 4, and with serial number 1234567, or the like).

In this way, the network management device 240 may perform an action based on a validation analysis of a discovered network relative using a designed network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Accordingly, some implementations described herein provide a network management device that performs a validation analysis to automatically map network devices of a branch network to network devices of a designed topology for the branch network. Accordingly, the network management device may estimate a topology of the branch network relative to the designed network and validate the branch network based on the estimated topology or detect conflicts in the estimated topology that are to be resolved. Based on the validation analysis, the network management device may reduce or eliminate user interaction, thus removing human error and eliminating subjectivity with regard to validating a network topology. Furthermore, some implementations, described herein, enable both user resources as well as network resources to be conserved as improper deployments of profiles and policies to network devices causing network failures, inoperability, or shutdowns may be avoided.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive designed network information corresponding to a designed network;
identify designed network devices and designed communication links of the designed network based on the designed network information;
generate a data graph corresponding to a topology of the designed network based on the designed network devices and designed communication links of the designed network;
receive discovered network information corresponding to discovered network devices of a discovered network;
identify the discovered network devices and discovered communication links of the discovered network based on the discovered network information;
generate a query graph corresponding to the discovered network based on the discovered network devices and the discovered communication links of the discovered network;
perform a validation analysis of a topology of the discovered network relative to the topology of the designed network based on the data graph and the query graph; and
perform an action based on a result of the validation analysis.

2. The device of claim 1, where the one or more processors, when generating the data graph, are to:
generate node information for nodes of the data graph using the designed network information,
the nodes corresponding to the designed network devices of the designed network,
the node information comprising information associated with the designed network devices indicated in the designed network information; and
generate edge information for edges of the data graph using the designed network information,
the edges corresponding to the designed communication links between the designed network devices of the designed network, and
the edge information comprising information associated with the designed communication links indicated in the designed network information.

3. The device of claim 1, where the one or more processors, when generating the query graph, are to:
generate node information for nodes of the query graph using the discovered network information,
the node information corresponding to the discovered network devices of the discovered network;
generate edge information for edges of the query graph using the discovered network information, the edge information corresponding to discovered communication links of the discovered network; and
where the one or more processors, when generating the query graph, are further to:
generate the query graph to include the node information and the edge information generated using the discovered network information.

4. The device of claim 1, where the one or more processors, when performing the validation analysis, are to:
estimate the topology of the discovered network by mapping the discovered network devices to designed network devices of the designed network based on the data graph and the query graph.

5. The device of claim 1, where the one or more processors, when performing the validation analysis, are to:
map the discovered network devices to the designed network devices of the designed network based on calculated similarities between nodes of the data graph and nodes of the query graph; and
estimate the topology of the discovered network based on mapping the discovered network devices to the designed network devices of the designed network.

6. The device of claim 1, where the one or more processors, when performing the action, are to:
determine that the topology of the discovered network is validated based on the validation analysis; and
cause profiles and policies to be deployed to the discovered network devices based on the topology of the discovered network being validated.

7. The device of claim 1, where the one or more processors, when performing the action, are to:
provide information associated with the validation analysis to cause a user interface to indicate a validation status of the topology of the discovered network based on the result of the validation analysis.

8. The device of claim 1, where the one or more processors, when performing the validation analysis, are to:
detect conflicts in the topology of the discovered network based on the data graph and the query graph; and
where the one or more processors, when performing the action, are to:
provide information associated with the conflicts to cause a user interface to indicate the conflicts to a user; and
address the conflicts based on a user input received via the user interface.

9. A non-transitory computer-readable medium storing instructions, the instructions comprising:
one or more instructions that, when executed by one or more processors, cause the one or more processors to:
receive designed network information corresponding to a designed network;
identify designed network devices and designed communication links of the designed network based on the designed network information;
generate a data graph corresponding to a topology of the designed network based on the designed network devices and designed communication links of the designed network;
receive discovered network information corresponding to discovered network devices of a discovered network;
identify the discovered network devices and discovered communication links of the discovered network based on the discovered network information;
generate a query graph corresponding to the discovered network based on the discovered network devices and the discovered communication links of the discovered network;
map the discovered network devices to the designed network devices of the designed network based on the data graph and the query graph;
perform a validation analysis of a topology of the discovered network determined based on mapping the discovered network devices to the designed network devices of the designed network; and
perform an action based on a result of the validation analysis.

10. The non-transitory computer-readable medium of claim 9, where the one or more instructions, that cause the one or more processors to map the discovered network devices, cause the one or more processors to:
calculate similarity scores between individual nodes of the query graph and individual nodes of the data graph; and
map the discovered network devices to the designed network devices of the designed network based on the similarity scores.

11. The non-transitory computer-readable medium of claim 9, where the one or more instructions, that cause the one or more processors to map the discovered network devices, cause the one or more processors to:
analyze a node of the data graph and a node of the query graph;
calculate a node similarity score between the node of the query graph and the node of the data graph,
the node similarity score indicating a measure of similarity between the node of the query graph and the node of the data graph based on a number of similar neighbor nodes between the node of the query graph and the node of the data graph;
calculate a neighbor node similarity score between the node of the query graph and the node of the data graph,
the neighbor node similarity score indicating a measure of similarity between the node of the query graph and the node of the data graph based on a number of similar neighbor nodes between neighbor nodes of the node of the query graph and neighbor nodes of the node of the data graph;
calculate a link similarity score between edges of the node of the query graph and edges of the node of the data graph,
the link similarity score indicating a measure of similarity between the edges of the node of the query graph and the edges of the node of the data graph based on a number of similar edge details between the edges of the node of the query graph and the edges of the node of the data graph; and
map the discovered network devices based on the node similarity score, the neighbor node similarity score, and/or the link similarity score.

12. The non-transitory computer-readable medium of claim 9, where the one or more instructions, that cause the one or more processors to map the discovered network devices, cause the one or more processors to:
iteratively calculate node similarity scores for first combinations of a node of the query graph and a node of the data graph based on a measure of similarity between neighbor nodes of the node of the query graph and the node of the data graph in the first combinations;
iteratively calculate neighbor node similarity scores for second combinations of a node of the query graph and a node of the data graph based on a measure of similarity between neighbor nodes of the neighbor nodes of the node of the query graph and the node of the data graph in the second combinations; and iteratively calculate link similarity scores for third combinations of a node of the query graph and a node of the data graph based on a measure of similarity between edges of the node of the query graph and edges of the node of the data graph in the third combinations; and map the discovered network devices based on the node similarity scores for the first combinations, the neighbor node similarity scores for the second combinations, and the link similarity scores for the third combinations.

13. The non-transitory computer-readable medium of claim 12, where the one or more instructions, that cause the one or more processors to map the discovered network devices, cause the one or more processors to:

select the second combinations of a node of the data graph and a node of the query graph from the first combinations of a node of the data graph and a node of the query graph based on the node similarity scores for the first combinations; and select the third combinations of a node of the data graph and a node of the query graph from the second combinations of a node of the data graph and a node of the query graph based on the neighbor node similarity scores for the second combinations.

14. The non-transitory computer-readable medium of claim 12, where the first combinations, the second combinations, and the third combinations comprise all combinations of a node from the query graph and a node from the data graph.

15. A method, comprising:

receiving, by a device, designed network information corresponding to a designed network;

identifying, by the device, designed network devices and designed communication links of the designed network based on the designed network information;

generating, by the device, a data graph corresponding to a topology of the designed network based on the designed network devices and designed communication links of the designed network;

receiving, by the device, discovered network information corresponding to discovered network devices of a discovered network;

identifying, by the device, the discovered network devices and discovered communication links of the discovered network based on the discovered network information;

generating, by the device, a query graph corresponding to the discovered network based on the discovered network devices and the discovered communication links of the discovered network;

performing, by the device, a validation analysis of a topology of the discovered network relative to the topology of the designed network using the data graph and the query graph; and providing, by the device, information associated with the validation analysis to permit an action to be performed.

16. The method of claim 15, further comprising:

mapping, by the device, the discovered network devices to the designed network devices of the designed network using the data graph and query graph; and providing the information associated with the validation analysis based on mapping the discovered network devices to the designed network devices of the designed network.

17. The method of claim 15, further comprising:

estimating the topology of the discovered network by mapping the discovered network devices to the designed network devices of the designed network using the data graph and the query graph.

18. The method of claim 15, where providing the information associated with the validation analysis comprises:

determining that the topology of the discovered network is validated based on the validation analysis; and providing information to cause profiles and policies to be deployed to the discovered network devices based on the topology of the discovered network being validated.

19. The method of claim 15, where generating the data graph comprises:

generating node information for nodes of the data graph using the designed network information, the nodes corresponding to the designed network devices of the designed network, the node information comprising information associated with the designed network devices indicated in the designed network information; and generating edge information for edges of the data graph using the designed network information, the edges corresponding to the designed communication links between the designed network devices of the designed network, and the edge information comprising information associated with the designed communication links indicated in the designed network information.

20. The method of claim 15, where generating the query graph comprises:

generating node information for nodes of the query graph using the discovered network information, the node information corresponding to the discovered network devices of the discovered network;

generating edge information for edges of the query graph using the discovered network information, the edge information corresponding to discovered communication links of the discovered network; and generating the query graph to include the node information and the edge information generated using the discovered network information.

* * * * *